(12) United States Patent
Han et al.

(10) Patent No.: US 10,754,097 B2
(45) Date of Patent: Aug. 25, 2020

(54) ADAPTER AND ADAPTER ASSEMBLY USING SAME

(71) Applicant: AVIC JONHON OPTRONIC TECHNOLOGY CO., LTD, Henan (CN)

(72) Inventors: Yunzhao Han, Henan (CN); Weike Li, Henan (CN); Wenhao Yao, Henan (CN); Xutao Wang, Henan (CN); Kai Hu, Henan (CN); Tao Liu, Henan (CN); Geng Xu, Henan (CN)

(73) Assignee: AVIC JONHON OPTRONIC TECHNOLOGY CO., LTD., Henan (CN)

( * ) Notice: Subject to any disclaimer, the term of this patent is extended or adjusted under 35 U.S.C. 154(b) by 9 days.

(21) Appl. No.: 15/780,639

(22) PCT Filed: Apr. 6, 2016

(86) PCT No.: PCT/CN2016/078596
§ 371 (c)(1),
(2) Date: Jun. 1, 2018

(87) PCT Pub. No.: WO2017/092210
PCT Pub. Date: Jun. 8, 2017

(65) Prior Publication Data
US 2018/0364423 A1    Dec. 20, 2018

(30) Foreign Application Priority Data
Dec. 3, 2015  (CN) .......................... 2015 1 0877065

(51) Int. Cl.
*G02B 6/36* (2006.01)
*G02B 6/38* (2006.01)
(Continued)

(52) U.S. Cl.
CPC ......... *G02B 6/3825* (2013.01); *G02B 6/3816* (2013.01); *G02B 6/3831* (2013.01);
(Continued)

(58) Field of Classification Search
CPC ...... G02B 6/3825; G02B 6/3831; G02B 6/38; H01R 13/5219; H01R 13/5202; H01R 31/06; H01R 13/6273
(Continued)

(56) References Cited

U.S. PATENT DOCUMENTS 5,439,386 A    8/1995 Ellis et al.
7,507,105 B1 * 3/2009 Peters .................... H01R 13/53
                                                       439/374
(Continued)

FOREIGN PATENT DOCUMENTS

CN        201173982        12/2008
CN        201229423         4/2009
(Continued)

OTHER PUBLICATIONS

"International Search Report (Form PCT/ISA/210)", dated Sep. 14, 2016, with English translation thereof, pp. 1-4.
(Continued)

*Primary Examiner* — Kaveh C Kianni
*Assistant Examiner* — Hung Q Lam
(74) *Attorney, Agent, or Firm* — JCIPRNET

(57) ABSTRACT

Disclosed are an adapter (6) and an adapter assembly using the adapter (6). The adapter (6) comprises an adapter shell (13, 12, 11), wherein an adapter socket contact part (18), an adapter socket locking structure, an adapter plug contact part (14), an adapter plug locking structure, and a seal fit portion for being inserted into a corresponding connecting sleeve (4) in a sealing manner are arranged on the adapter shell (13, 12, 11), and the seal fit portion is located between the adapter (Continued)

socket locking structure and the adapter plug locking structure. The adapter and the adapter assembly using same have a waterproof function.

8 Claims, 4 Drawing Sheets

(51) Int. Cl.
 *H01R 13/52* (2006.01)
 *H01R 13/627* (2006.01)
 *H01R 31/06* (2006.01)

(52) U.S. Cl.
 CPC ....... *G02B 6/3846* (2013.01); *H01R 13/5202* (2013.01); *H01R 13/5219* (2013.01); *G02B 6/3893* (2013.01); *H01R 13/6273* (2013.01); *H01R 31/06* (2013.01)

(58) Field of Classification Search
 USPC .... 385/31, 53, 65–68, 75, 78, 81–84, 92, 94
 See application file for complete search history.

(56) References Cited

U.S. PATENT DOCUMENTS

| | | | |
|---|---|---|---|
| 2003/0129873 | A1 | 7/2003 | Heebe et al. |
| 2012/0071019 | A1* | 3/2012 | Takamatsu ........... G02B 6/3821 439/370 |

FOREIGN PATENT DOCUMENTS

| | | |
|---|---|---|
| CN | 102162881 | 8/2011 |
| CN | 102195195 | 9/2011 |
| CN | 102668263 | 9/2012 |
| CN | 202695898 | 1/2013 |
| CN | 203288911 | 11/2013 |
| CN | 203645105 | 6/2014 |
| CN | 204067533 | 12/2014 |
| JP | 2001141958 | 5/2001 |
| JP | 2005135796 | 5/2005 |

OTHER PUBLICATIONS

"Office Action of Japan Counterpart Application," dated Jun. 25, 2019, p. 1-p. 3.

* cited by examiner

ADAPTER AND ADAPTER ASSEMBLY USING SAME

CROSS-REFERENCE TO RELATED APPLICATION

This application is a 371 application of International PCT application serial no. PCT/CN2016/078596, filed on Apr. 6, 2016, which claims priority benefit of China Application No. 201510877065.9, filed on Dec. 3, 2015. The entirety of each of the above—mentioned patent applications is hereby incorporated by reference herein and made a part of this specification.

BACKGROUND OF THE INVENTION

1. Field of the Invention

The present invention relates to the field of signal connectors, in particular to an adapter and an adapter assembly using the adapter.

2. Description of Related Art

In daily production and life, introducing a signal into a cabinet by a cable or introducing the signal out of the cabinet by a cable is often needed, and a common practice is to arrange a cabinet socket on the body of the cabinet and to arrange a cable plug at the end of the cable, so that the signal transmission is realized through the insertion of the cable plug and the cabinet socket. However, as the cable plug and the cabinet socket may not correspond, an adapter needs to be arranged between the cable plug and the cabinet socket for the time being. An optical attenuated optical electrical integrated adaptor connector disclosed in China patent CN102162881A is a traditional adapter which comprises an adapter shell, wherein an adapter socket contact part for being connected with contact parts (an electrical contact part and an optical contact part) of the cable plug in an adaptation manner and a connecting nut, namely an adapter socket locking structure, for being connected with a shell of the cable plug in a locking mariner are arranged on the adapter shell; and an adapter plug contact part for being connected with a contact part of the cabinet socket in an adaptation manner and an external thread, namely an adapter plug locking structure, for being connected with a shell of the cabinet socket in a locking manner are also arranged on the adapter shell. When the adapter is in use, the cable plug is inserted into one end of the adapter, the dropping prevention of the adapter and the cable plug is realized through locking the adapter socket locking structure and the shell of the cable plug, the dropping prevention of the adapter and the cabinet socket is realized through locking the adapter plug locking structure and the shell of the cabinet socket, and the transmission of optical signals and/or electrical signals is realized through the adapter plug contact part and the adapter socket contact part. The problem of the traditional adapter is that as the adapter is lack of a corresponding waterproof structure, the adapter can only be used indoors and cannot be used outdoors.

SUMMARY OF THE INVENTION

The present invention is directed to an adapter with a waterproof function; and the present invention is also directed to an adapter assembly using the adapter.

In order to solve the problem, the technical solution of the adapter assembly of the present invention is as follows:

The adapter assembly comprises an adapter, wherein the adapter comprises an adapter shell; an adapter socket contact part for being connected with a contact part of a cable plug in an adaptation manner, an adapter socket locking structure for being connected with a shell of the cable plug in a locking manner, an adapter plug contact part for being connected with a contact part of a cabinet socket in an adaptation manner and an adapter plug locking structure for being connected with a shell of the cabinet socket in a locking manner are arranged on the adapter shell; the adapter assembly also comprises a connecting sleeve which is detachably connected with a corresponding cabinet through a sealing detachable connecting structure in a sealing manner, and a seal fit portion is inserted into the connecting sleeve in a sealing manner, where the seal fit portion is on the adapter shell and is between the adaptor socket locking structure and the adapter plug locking structure.

The sealing detachable connecting structure comprises a connecting nut rotatably arranged on the connecting sleeve in a sleeving manner, and a sealing gasket arranged on the connecting sleeve in a sleeving manner.

The seal fit portion comprises a positioning circular column and a shell sealing ring arranged on the positioning circular column in a sleeving manner.

The adapter plug locking structure comprises a locking fastener which overhangs elastically, gradually and upwards from front to back and is used for being matched with the cabinet socket in a clamping manner so as to realize locking; an unlocking arm at the rear side of the locking fastener is arranged on the adapter shell and is used for pressing the locking fastener downwards so as to realize the unlocking of the locking fastener; and the rear end of the unlocking arm is arranged on the positioning circular column or is next to the positioning circular column.

The front end of the unlocking arm overhangs straightly to the upper end of the locking fastener along a forward and backward direction.

Both the adapter socket contact part and the adapter plug contact part are optical contact parts; the adapter shell comprise a front shell portion, a middle shell portion and a rear shell portion which are arranged sequentially from front to back in a separation manner; the adapter plug locking structure is arranged on the front shell portion; the adapter socket locking structure is arranged on the rear shell portion; a mounting hole is formed in the middle shell portion and penetrates the middle shell portion along a forward and backward direction; the adapter plug contact part is arranged at the front end of the mounting hole through a front fixing sleeve; a rear fixing sleeve is assembled at the rear end of the mounting hole through a sleeve sealing ring; the adapter socket contact part is fixedly arranged in the rear fixing sleeve; the rear shell portion is arranged on the periphery of the adapter socket contact part; and the front shell portion is arranged on the periphery of the adapter plug contact part.

The technical solution of an adapter of the present invention is as follows:

The adapter comprises an adapter shell, wherein an adapter socket contact part for being connected with a contact part of a cable plug in an adaptation manner, an adapter socket locking structure for being connected with a shell of the cable plug in a locking manner, an adapter plug contact part for being connected with a contact part of a cabinet socket in an adaptation manner and an adapter plug locking structure for being connected with a shell of the cabinet socket in a locking manner are arranged on the adapter shell; and a seal fit portion is inserted into the connecting sleeve in a sealing manner, where the seal fit portion is on the adapter shell and is between the adaptor socket locking structure and the adapter plug locking structure.

The seal fit portion comprises a positioning circular column and a shell sealing ring arranged on the positioning circular column in a sleeving manner.

The adapter plug locking structure comprises a locking fastener which overhangs elastically, gradually and upwards from front to back and is used for being matched with a cabinet socket in a clamping manner so as to realize locking; an unlocking arm at the rear side of the locking fastener is arranged on the adapter shell and is used for pressing the locking fastener downwards so as to realize the unlocking of the locking fastener; and the rear end of the unlocking arm is arranged on the positioning circular column or is next to the positioning circular column.

Both the adapter socket contact part and the adapter plug contact part are optical contact parts; the adapter shell comprise a front shell portion, a middle shell portion and a rear shell portion which are arranged sequentially from front to back in a separation manner; the adapter plug locking structure is arranged on the front shell portion; the adapter socket locking structure is arranged on the rear shell portion; a mounting hole is alined in the middle shell portion and penetrates the middle shell portion along a forward and backward direction; the adapter plug contact part is arranged at the front end of the mounting hole through a front fixing sleeve; a rear fixing sleeve is assembled at the rear end of the mounting hole through a sleeve sealing ring; the adapter socket contact part is fixedly arranged in the rear fixing sleeve; the rear shell portion is arranged on the periphery of the adapter socket contact part; and the front shell portion is arranged on the periphery of the adapter plug contact part.

The adapter and the adapter assembly have the beneficial effects that when the adapter and the adapter assembly are in use, the adapter plug locking structure is matched with the shell of the cabinet socket in a locking manner so as to realize the dropping prevention between the cabinet and the adapter, the adapter socket locking structure is matched with the shell of the cable plug in a locking manner so as to realize the dropping prevention between the cable plug and the adapter, the connecting sleeve is detachably connected with the cabinet through a sealing detachable connecting structure in a sealing manner so as to realize the sealing between the connecting sleeve and the cabinet, and the seal fit portion on the adapter shell is inserted into the connecting sleeve in a sealing manner so as to realize the sealing between the adapter and the connecting sleeve, thereby ensuring good waterproof working conditions and enabling the adapter to be capable of being used in outdoor environments.

DESCRIPTION OF THE EMBODIMENTS

Figure 1:
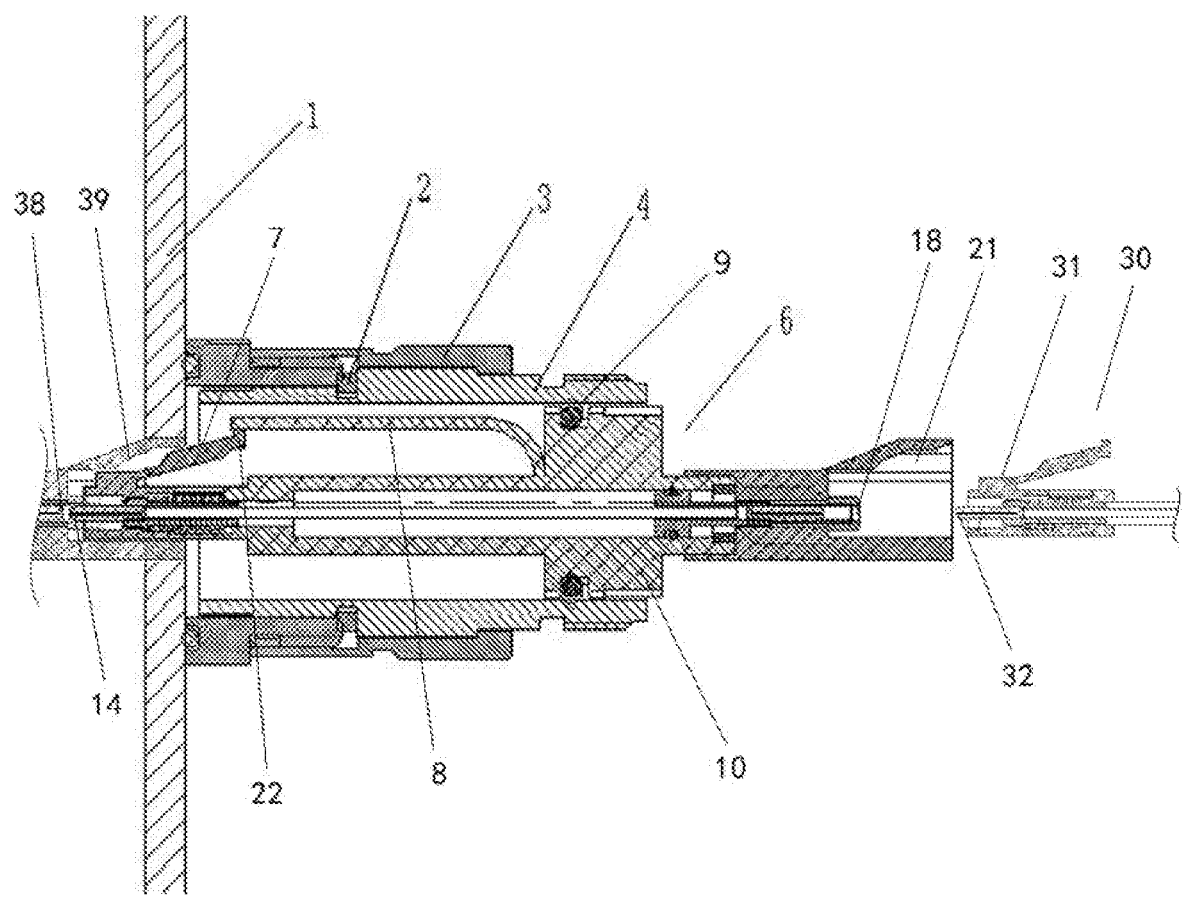
FIG. 1 is the usage state diagram of the embodiment 1 of the adapter assembly in the present invention.
Figure 2:
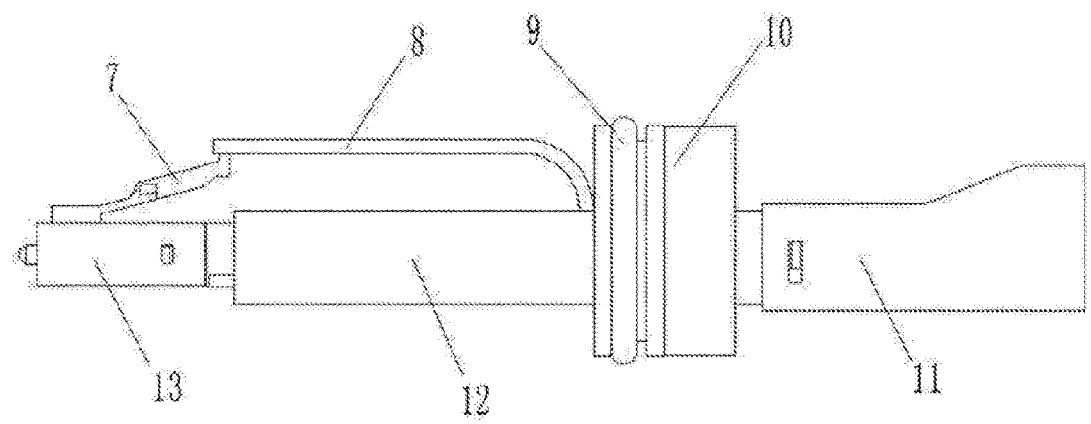
FIG. 2 is the structural schematic diagram of the adapter shown in FIG. 1.
Figure 3:
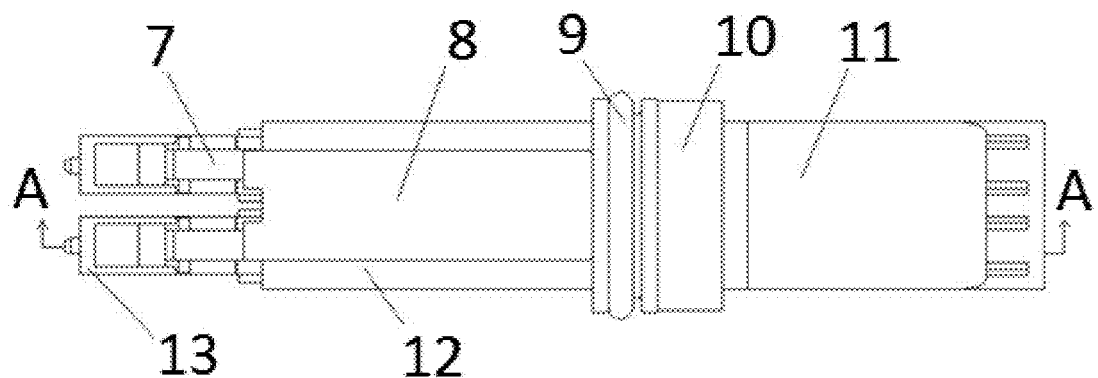
FIG. 3 is the top view of FIG. 2.
Figure 4:
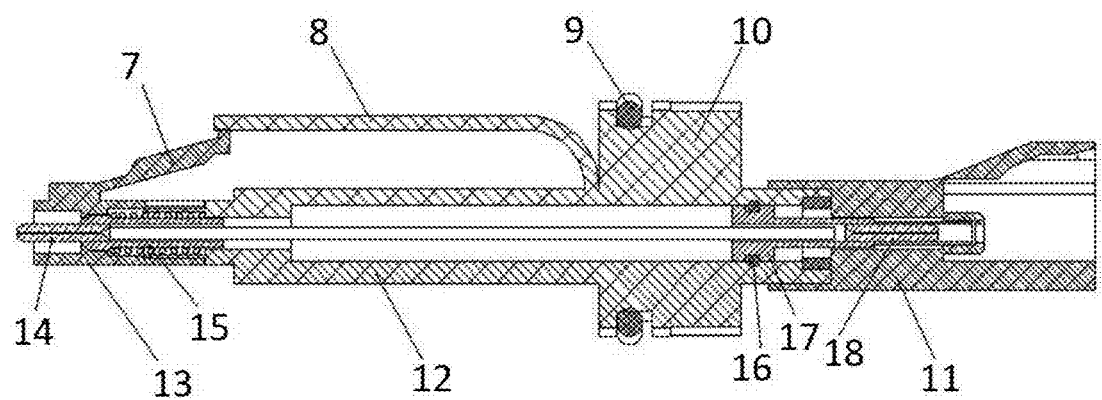
FIG. 4 is the A-A direction sectional view in FIG. 3.

The embodiment 1 of the adapter assembly is as shown in FIGS. 1-4: comprises an adapter 6 and a connecting sleeve 4 which is used for being detachably connected with a corresponding cabinet 1 through a sealing detachable connecting structure in a sealing manner, wherein the sealing detachable connecting structure comprises a connecting nut 3 rotatably arranged on the connecting sleeve 4 in a sleeving manner, and a sealing gasket 2 arranged on the connecting sleeve 4 in a sleeving manner. The adapter 6 comprises the adapter shell, wherein the adapter shell comprise a front shell portion 13, a middle shell portion 12 and a rear shell portion 11 which are arranged sequentially from front to back in a separation manner; an adapter socket locking structure 21 used for being connected with a shell of a cable plug 31 in a locking manner is arranged on the rear shell portion 11; an adapter plug locking structure 22 for being connected with a shell of a cabinet socket 39 in a locking manner is arranged on the front shell portion 13; and an adapter socket contact part 18 and an adapter plug contact part 14 are respectively arranged at the two ends of the middle shell portion 12. The adapter socket contract part 18 for being connected with a contact part of a cable plug 32 in an adaption manner. The adapter 6 in the present embodiment is a duplex LC adapter, and therefore, both the adapter plug contact part 14 and the adapter socket contact part 18 are optical contact parts; a mounting hole is formed in the middle shell portion 12 and penetrates the middle shell portion 12 along a forward and backward direction; the adapter plug contact part 14 is arranged at the front end of the mounting hole through a front fixing sleeve 15; a rear fixing sleeve 17 is assembled at the rear end of the mounting hole through a sleeve sealing ring 16; the adapter socket contact part 18 is fixedly arranged in the rear fixing sleeve 17; and after the assembly of the adapter plug contact part 14 and the adapter socket contact part 18 is completed, the front shell portion 13 and the rear shell portion 11 are assembled at the front end and rear end of the middle shell portion 12, the rear shell portion 11 is arranged on the periphery of the adapter socket contact part 18, and the front shell portion 13 is arranged on the periphery of the adapter plug contact part 14. A seal fit portion is inserted into the connecting sleeve 4 in a sealing manner, where the seal fit portion is on the adapter shell and is between the adaptor socket locking structure 21 and the adapter plug locking structure 22. The seal fit portion comprises a positioning circular column 10 integrally arranged on the middle shell portion 12 and a shell sealing ring 9 arranged on the positioning circular column 10 in a sleeving manner.

As the adapter 6 is the LC adapter, the adapter plug locking structure 22 and the adapter socket locking structure 21 also adopt locking structures frequently used in the LC adapter, namely, the adapter plug locking structure 22 comprises a locking fastener 7 which overhangs elastically from front to back; the locking fastener 7, the front shell portion 13 and the adapter plug contact part 14 are equivalent to one LC plug; and when the LC plug and the cabinet socket 38 are oppositely inserted, the locking fastener 7 is clamped in a clamping groove of the cabinet socket 38, thereby realizing the locking of the cabinet socket 38 and the adapter 6. An unlocking arm 8 is arranged on the middle shell portion 12; the rear end of the unlocking aim 8 is next to the positioning circular column 10, so that the unlocking arm 8 is conveniently pressed; the font end of the unlocking arm 8 overhangs straightly to the upper end of the locking fastener 7 along the forward and backward direction; and the locking fastener 7 can be pressed downwards by pressing the unlocking arm 8, so that the locking fastener 7 can drop out of the clamping groove in the cabinet socket 38 to realize unlocking. The adapter socket locking structure 21 is the clamping groove; the clamping groove, the rear shell portion 11 and the adapter socket contact part 18 are equivalent to one LC socket; and when the cable plug 30 is inserted into the LC socket, the locking fastener on the cable plug 30 is clamped in the clamping groove to realize locking.

When using the adapter, the LC plug is connected with the cabinet socket, and then the connecting sleeve is locked on the cabinet, so that the connection of the adapter and the cabinet is realized; the IP67 and the IP68 waterproof ratings are achieved eventually due to the seal fit between the adapter shell and the connecting sleeve, the seal fit between the connecting sleeve and the cabinet and the seal fit between the rear fixing sleeve and the middle shell portion, so that the adapter can be used outdoors; further, the cable plug and the LC socket are oppositely inserted to complete assembly; and when the adapter needs to be disassembled, the connecting nut on the connecting sleeve is unscrewed, so that the connecting sleeve moves backwards relative to the adapter shell to expose the unlocking arm, thereby realizing the unlocking between the locking fastener and the cabinet socket by pressing the unlocking arm. In other embodiments of the present invention, the sealing gasket can also be replaced with the sealing ring, of course, the detachable connection between the connecting sleeve and the cabinet can also be realized through different connecting nuts, and for example, the detachable connection between the connecting sleeve and the cabinet can be realized by a bolt and a flange; the shell sealing ring can also be replaced with a rubber layer vulcanized on the positioning circular column as long as the sealing insertion between the positioning circular column and the connecting sleeve is guaranteed; the cross section of the seal fit portion can also be square; the unlocking arm can also be arranged on the positioning circular column; the front shell portion, the middle shell portion and the rear shell portion can also arranged integrally, and for the time being, a sealing ring between the rear fixing sleeve and the mounting hole can be omitted; the adapter can also be a simplex LC adapter; and of course, the adapter is not limited to an LC optical fibre connector, such as FC optical adapters and SC optical adapters or electrical adapters or optical and electrical mixing adapters.

Figure 5:
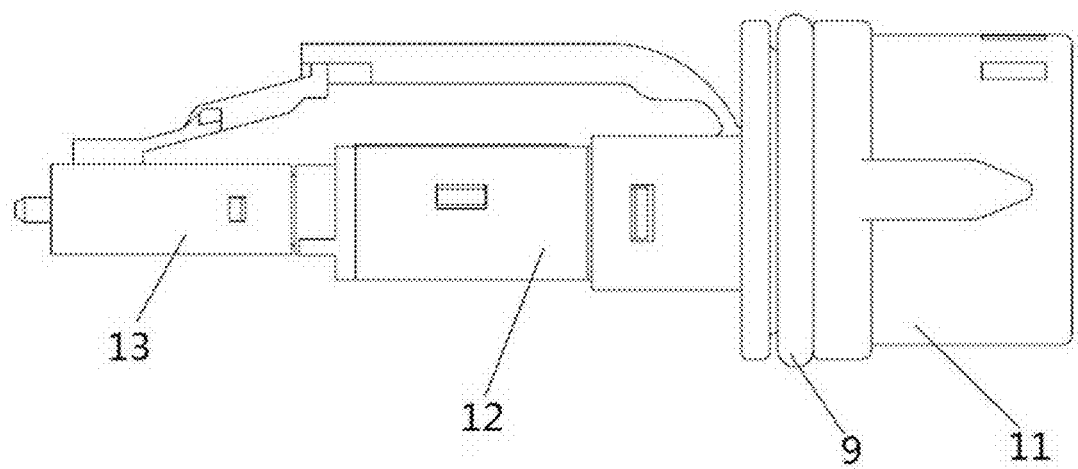
FIG. 5 is the structural schematic diagram of the adapter in the embodiment 2 of the adapter assembly in the present invention.
Figure 6:
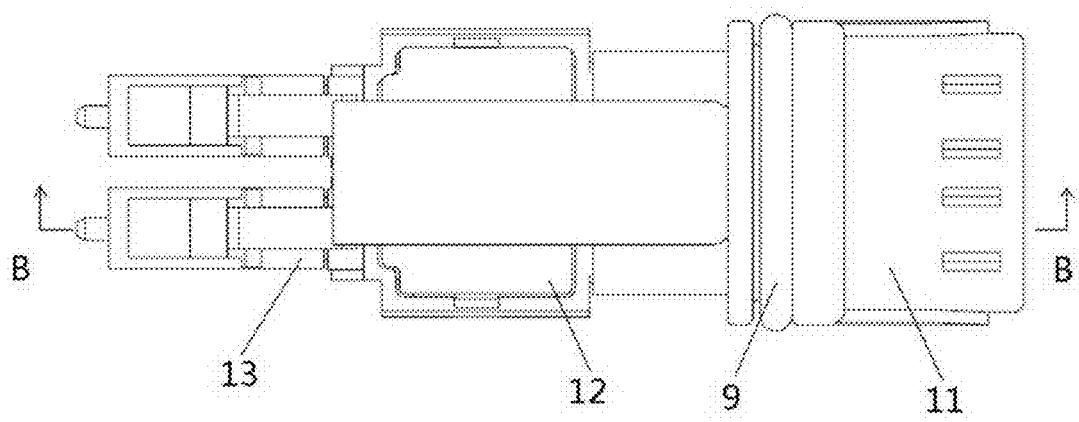
FIG. 6 is the top view of FIG. 5.
Figure 7:
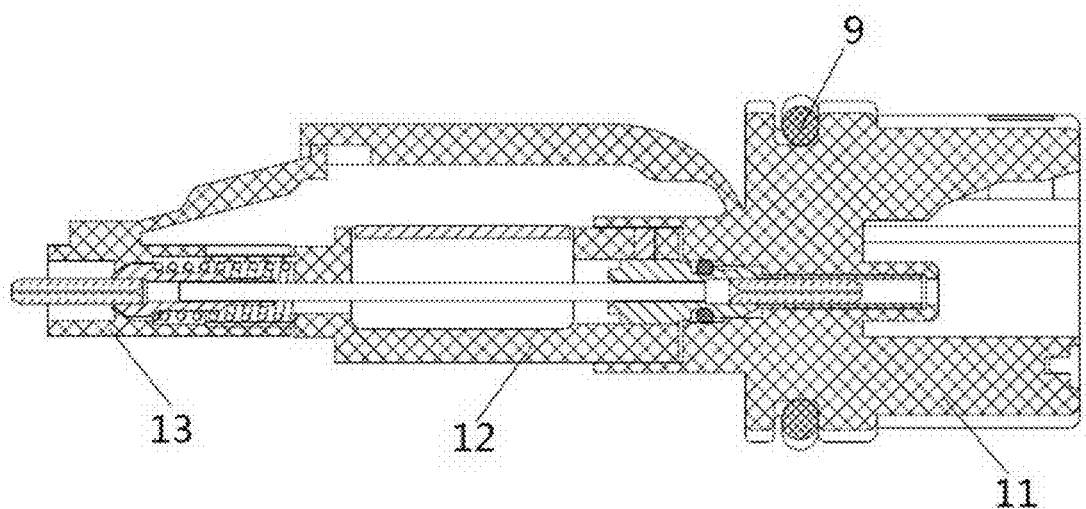
FIG. 7 is the B-B direction sectional view in FIG. 6.

The embodiment 2 of the adapter assembly is as shown in FIGS. 5-7. The difference between the embodiment 2 and the embodiment 1 lies in that the shell sealing ring 9 is arranged on the rear shell portion 11; 13 in the figures represents the front shell portion; and 12 in the figures represents the middle shell portion.

The embodiment of the adapter is as shown in FIGS. 1-7. The specific structure of the adapter is identical to the structure of the adapter in the embodiments of the adapter assembly, and the descriptions thereof are omitted herein.

What is claimed is:

1. An adapter, comprising: an adapter shell, wherein an adapter socket contact part for being connected with a contact part of a cable plug in an adaptation manner, an adapter socket locking structure for being connected with a shell of the cable plug in a locking manner, an adapter plug contact part for being connected with a contact part of a cabinet socket in an adaptation manner and an adapter plug locking structure for being connected with a shell of the cabinet socket in a locking manner are arranged on the adapter shell; wherein a seal fit portion is inserted into a connecting sleeve in a sealing manner and moves relative to the connecting sleeve, where the seal fit portion is on the adapter shell and is between the adaptor socket locking structure and the adapter plug locking structure, wherein the seal fit portion comprises a positioning circular column and a shell sealing ring arranged on the positioning circular column in a sleeving manner, wherein the adapter plug locking structure comprises a locking fastener which overhangs elastically, gradually and upwards from front to back and is used for being matched with a cabinet socket in a clamping manner so as to realize locking; an unlocking arm at the rear side of the locking fastener is arranged on the adapter shell and is used for pressing the locking fastener downwards so as to realize the unlocking of the locking fastener; and the rear end of the unlocking arm is arranged on the positioning circular column or is next to the positioning circular column.

2. The adapter according to claim 1, wherein both the adapter socket contact part and the adapter plug contact part are optical contact parts;

the adapter shell comprise a front shell portion, a middle shell portion and a rear shell portion which are arranged sequentially from front to back in a separation manner; the adapter plug locking structure is arranged on the front shell portion; the adapter socket locking structure is arranged on the rear shell portion; a mounting hole is formed in the middle shell portion and penetrates the middle shell portion along a forward and backward direction; the adapter plug contact part is arranged at the front end of the mounting hole through a front fixing sleeve; a rear fixing sleeve is assembled at the rear end of the mounting hole through a sleeve sealing ring; the adapter socket contact part is fixedly arranged in the rear fixing sleeve; the rear shell portion is arranged on the periphery of the adapter socket contact part; and the front shell portion is arranged on the periphery of the adapter plug contact part.

3. An adapter assembly, comprising: an adapter, wherein the adapter comprises an adapter shell; an adapter socket contact part for being connected with a contact part of a cable plug in an adaptation manner, an adapter socket locking structure for being connected with a shell of the cable plug in a locking manner, an adapter plug contact part for being connected with a contact part of a cabinet socket in an adaptation manner and an adapter plug locking structure for being connected with a shell of the cabinet socket in a locking manner are arranged on the adapter shell; wherein the adapter assembly also comprises a connecting sleeve which is detachably connected with a corresponding cabinet through a sealing detachable connecting structure in a sealing manner, and a seal fit portion is inserted into the connecting sleeve in a sealing manner and moves relative to the connecting sleeve, where the seal fit portion is on the adapter shell and is between the adaptor socket locking structure and the adapter plug locking structure, wherein the seal fit portion comprises a positioning circular column and a shell sealing ring arranged on the positioning circular column in a sleeving manner, wherein the adapter plug locking structure comprises a locking fastener which overhangs elastically, gradually and upwards from front to back and is used for being matched with the cabinet socket in a clamping manner so as to realize locking; an unlocking arm at the rear side of the locking fastener is arranged on the adapter shell and is used for pressing the locking fastener downwards so as to realize the unlocking of the locking fastener; and the rear end of the unlocking arm is arranged on the positioning circular column or is next to the positioning circular column.

4. The adapter assembly according to claim 3, wherein the sealing detachable connecting structure comprises a connecting nut rotatably arranged on the connecting sleeve in a sleeving manner and a sealing gasket arranged on the connecting sleeve in a sleeving manner.

5. The adapter assembly according to claim 3, wherein the front end of the unlocking arm overhangs straightly to the upper end of the locking fastener along the forward and backward direction.

6. The adapter assembly according to claim 3, wherein both the adapter socket contact part and the adapter plug contact part are optical contact parts; the adapter shell comprise a front shell portion, a middle shell portion and a rear shell portion which are arranged sequentially from front to back in a separation manner; the adapter plug locking structure is arranged on the front shell portion; the adapter socket locking structure is arranged on the rear shell portion; a mounting hole is formed in the middle shell portion and penetrates the middle shell portion along a forward and backward direction; the adapter plug contact part is arranged at the front end of the mounting hole through a front fixing sleeve; a rear fixing sleeve is assembled at the rear end of the mounting hole through the sleeve sealing ring; the adapter socket contact part is fixedly arranged in the rear fixing sleeve; the rear shell portion is arranged on the periphery of the adapter socket contact part; and the front shell portion is arranged on the periphery of the adapter plug contact part.

7. The adapter assembly according to claim 4, wherein both the adapter socket contact part and the adapter plug contact part are optical contact parts; the adapter shell comprise a front shell portion, a middle shell portion and a rear shell portion which are arranged sequentially from front to back in a separation manner; the adapter plug locking structure is arranged on the front shell portion; the adapter socket locking structure is manged on the rear shell portion; a mounting hole is formed in the middle shell portion and penetrates the middle shell portion along a forward and backward direction; the adapter plug contact part is arranged at the front end of the mounting hole through a front fixing sleeve; a rear fixing sleeve is assembled at the rear end of the mounting hole through the sleeve sealing ring; the adapter socket contact part is fixedly arranged in the rear fixing sleeve; the rear shell portion is arranged on the periphery of the adapter socket contact part; and the front shell portion is arranged on the periphery of the adapter plug contact part.

8. The adapter assembly according to claim 5, wherein both the adapter socket contact part and the adapter plug contact part are optical contact parts; the adapter shell comprise a front shell portion, a middle shell portion and a rear shell portion which are arranged sequentially from front to back in a separation manner; the adapter plug locking structure is arranged on the front shell portion; the adapter socket locking structure is arranged on the rear shell portion; a mounting hole is formed in the middle shell portion and penetrates the middle shell portion along a forward and backward direction; the adapter plug contact part is arranged at the front end of the mounting hole through a front fixing sleeve; a rear fixing sleeve is assembled at the rear end of the mounting hole through the sleeve sealing ring; the adapter socket contact part is fixedly arranged in the rear fixing sleeve; the rear shell portion is arranged on the periphery of the adapter socket contact part; and the front shell portion is arranged on the periphery of the adapter plug contact part.

* * * * *

UNITED STATES PATENT AND TRADEMARK OFFICE
CERTIFICATE OF CORRECTION

| | | |
|---|---|---|
| PATENT NO. | : 10,754,097 B2 | Page 1 of 1 |
| APPLICATION NO. | : 15/780639 | |
| DATED | : August 25, 2020 | |
| INVENTOR(S) | : Yunzhao Han et al. | |

It is certified that error appears in the above-identified patent and that said Letters Patent is hereby corrected as shown below:

On the Title Page

Item (73), should read:
AVIC JONHON OPTRONIC TECHNOLOGY CO., LTD, Henan, (CN)

In the Claims

Claim 7, Column 7, Line 32 - Column 8, Lines 1-15, should read:
The adapter assembly according to claim 4, wherein both the adapter socket contact part and the adapter plug contact part are optical contact parts; the adapter shell comprise a front shell portion, a middle shell portion and a rear shell portion which are arranged sequentially from front to back in a separation manner; the adapter plug locking structure is arranged on the front shell portion; the adapter socket locking structure is arranged on the rear shell portion; a mounting hole is formed in the middle shell portion and penetrates the middle shell portion along a forward and backward direction; the adapter plug contact part is arranged at the front end of the mounting hole through a front fixing sleeve; a rear fixing sleeve is assembled at the rear end of the mounting hole through the sleeve sealing ring; the adapter socket contact part is fixedly arranged in the rear fixing sleeve; the rear shell portion is arranged on the periphery of the adapter socket contact part; and the front shell portion is arranged on the periphery of the adapter plug contact part.

Signed and Sealed this
Seventeenth Day of November, 2020

Andrei Iancu
*Director of the United States Patent and Trademark Office*